United States Patent
Lee

(10) Patent No.: US 10,645,205 B2
(45) Date of Patent: May 5, 2020

(54) FOLDABLE DEVICE AND METHOD FOR CONTROLLING THE SAME

(71) Applicant: SAMSUNG DISPLAY CO., LTD., Yongin-si, Gyeonggi-do (KR)

(72) Inventor: Jung Hun Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/263,332

(22) Filed: Jan. 31, 2019

(65) Prior Publication Data

US 2019/0245955 A1  Aug. 8, 2019

(30) Foreign Application Priority Data

Feb. 2, 2018 (KR) .................... 10-2018-0013477

(51) Int. Cl.
  *G06F 1/16* (2006.01)
  *H04M 1/02* (2006.01)
  *G06F 3/0488* (2013.01)

(52) U.S. Cl.
  CPC ........ *H04M 1/0216* (2013.01); *G06F 1/1616* (2013.01); *G06F 1/1624* (2013.01); *G06F 1/1641* (2013.01); *G06F 1/1643* (2013.01); *G06F 1/1652* (2013.01); *G06F 1/1677* (2013.01); *G06F 1/1681* (2013.01); *H04M 1/0237* (2013.01); *H04M 1/0241* (2013.01); *H04M 1/0245* (2013.01); *H04M 1/0268* (2013.01); *G06F 3/0488* (2013.01); *H04M 2250/16* (2013.01)

(58) Field of Classification Search
  CPC ......... H04M 1/0216; G09F 9/301; G06F 1/16
  See application file for complete search history.

(56) References Cited

U.S. PATENT DOCUMENTS

| | | | |
|---|---|---|---|
| 2014/0362513 A1* | 12/2014 | Nurmi | G06F 1/1652 361/679.27 |
| 2015/0055287 A1 | 2/2015 | Seo | |
| 2015/0201487 A1 | 7/2015 | Kee et al. | |
| 2015/0338888 A1 | 11/2015 | Kim et al. | |
| 2016/0070305 A1* | 3/2016 | Kim et al. | G06F 1/1652 345/173 |
| 2017/0061836 A1* | 3/2017 | Kim et al. | G09F 9/301 |

FOREIGN PATENT DOCUMENTS

| | | |
|---|---|---|
| KR | 10-2015-0084260 A | 7/2015 |
| KR | 10-2016-0127281 A | 11/2016 |

* cited by examiner

*Primary Examiner* — Myron Wyche
(74) *Attorney, Agent, or Firm* — Lewis Roca Rothgerber Christie LLP

(57) ABSTRACT

A foldable device includes: a panel support unit including a first support plate, a second support plate, and a multi-joint member connecting between the first support plate and the second support plate; and a display panel on the first support plate, the second support plate, and the multi-joint member, and the multi-joint member includes a plurality of joint units, each including a fixed end supporting the display panel and a free end extending from the fixed end and rotatable about a hinge shaft, and distances between the free ends of at least two adjacent first joint units among the plurality of joint units are regular when the display panel is in a folded state and an opened state.

19 Claims, 17 Drawing Sheets

FOLDABLE DEVICE AND METHOD FOR CONTROLLING THE SAME

CROSS-REFERENCE TO RELATED APPLICATION

This application claims priority to and the benefit of Korean Patent Application No. 10-2018-0013477, filed on Feb. 2, 2018 in the Korean Intellectual Property Office, the entire content of which is incorporated herein by reference.

BACKGROUND

1. Field

Aspects of embodiments of the present disclosure relate to a foldable device and a control method thereof.

2. Description of the Related Art

Recently, several types of flexible devices that use a flexible display panel have been researched and developed. As a display panel in which a plurality of pixels is arranged on a flexible substrate, such as a plastic film, the flexible display panel has an easy bending property. The foldable device is one type of the flexible device, and may have a structure that can be easily switched to an opened state from a folded state or from the folded state to the opened state due to the easy bending property.

When the switch between the folded state and the opened state is more frequent, a portion that is being bent when the foldable device is in the folded state may be stressed. When such stress is concentrated, various defects may occur in the flexible display panel that is disposed corresponding to such a portion of the foldable device.

In addition, the use of the foldable device has led to various application areas. Foldable devices can be applied to new areas of portable IT products, such as electronic books that can replace publications such as magazines, textbooks, books and cartoons, ultra-small PCs that can be folded and moved, and smart cards that can check real-time information. Thus, it is desirable to develop an interface that can utilize these advantages while reflecting the characteristics of the foldable device.

The above information disclosed in this Background section is only for enhancement of understanding of the background and, therefore, it may contain information that does not form the prior art that is already known in this country to a person of ordinary skill in the art.

SUMMARY

According to an aspect of exemplary embodiments, a defect of a flexible display panel mounted in a foldable device may be prevented or substantially prevented.

According to another aspect of exemplary embodiments, a user may easily use associated functions.

According to another aspect of exemplary embodiments, a new user experience may be provided to a user through the foldable device.

A foldable device according to one or more exemplary embodiments includes: a panel support unit including a first support plate, a second support plate, and a multi-joint member connecting between the first support plate and the second support plate; and a display panel on the first support plate, the second support plate, and the multi-joint member, wherein the multi-joint member includes a plurality of joint units, each including a fixed end supporting the display panel and a free end extending from the fixed end and rotatable about a hinge shaft, and distances between the free ends of at least two adjacent first joint units among the plurality of joint units are regular when the display panel is in a folded state and an opened state.

When the display panel is slid along a first direction while being in the folded state, the distances between the free ends of the at least two adjacent first joint units among the plurality of joint units may be reduced.

When the display device is slid along a second direction that is opposite to the first direction while being in the folded state, distances between free ends of at least two adjacent second joint units among the plurality of joint units may be increased, and the first joint units may be adjacent to the first support plate and the second joint units may be adjacent to the second support plate.

The foldable device may further include: a state detection sensor configured to detect the opened state and the folded state and detects a bent location in the folded state; and a controller configured to compare an area of a first area and an area of a second area of the foldable device divided while being in the folded state by using the folded location, and to perform operations corresponding to comparison results.

The foldable device may further include: a case, the display panel being at a front side of the case; and a camera unit and a speaker unit that are arranged apart from each other along the first direction at a rear side of the case, wherein, when the area of the first area is larger than the area of the second area, the camera unit may be exposed to an outside, and when the area of the second area is larger than the area of the first area, the speaker unit may be exposed to the outside.

When the area of the first area is larger than the area of the second area, the controller may drive the camera unit.

When the area of the second area is larger than the area of the first area, the controller may drive the speaker unit.

When the area of the second area and the area of the first area are the same, the controller may activate a lock state.

The state detection sensor may be further configured to detect whether the display panel is in the opened state or the folded state, and when the display panel is changed to the folded state from the opened state, and to compare an area of the first area and an area of the second area in the folded state by using the bent location, and to perform operations corresponding to comparison results.

When the display panel is changed to the folded state from the opened state and the area of the first area and the area of the second area are the same, the controller may display execution screens of applications that are different from each other in the two areas of the display panel that are divided in the folded state.

A foldable device according to one or more exemplary embodiments includes: a display unit including two flat units and a bendable unit disposed between the two flat units; a case, the display unit being at a front side of the case; a camera unit and a speaker unit that are arranged apart from each other along a first direction at a rear side of the case; a state detection sensor configured to detect a folded state and an opened state of the display unit, and when the bendable unit is bent with reference to a reference line in a second direction that crosses the first direction in the opened state, to detect a location of the reference line; and a controller configured to drive the camera unit or the speaker unit according to the location of the reference line.

The display unit may include: a display panel that includes two flat areas corresponding to the two flat units and a bendable area corresponding to the bendable unit, and configured to display an image; and a panel support unit including a first support plate and a second plate that respectively support the two flat areas, and a multi-joint member.

The multi-joint member may include a plurality of joint units, each including a fixed end that supports the display panel and a free end that extends from the fixed end and rotates about a hinge shaft, and distances between the free ends of at least two adjacent first joint units among the plurality of joint units may be regular between the folded state and the opened state of the display unit.

When the sliding unit slides along the first direction in the folded state, the distances between the at least two adjacent first joint units among the plurality of joint units may be reduced.

When the display unit slides along a third direction that is opposite to the first direction in the folded state, distances between the free ends of at least two adjacent second joint units among the plurality of joint units may be increased, and the first joint units may be adjacent to the first support plate and the second joint units may be adjacent to the second support plate.

A control method of a foldable device including a case that forms an appearance thereof, a display unit that is arranged at a front side of the case and includes two flat units and a bendable unit between the two flat units, and a camera unit and a speaker unit that are arranged apart from each other along a first direction at a rear side of the case, according to one or more exemplary embodiments, includes: detecting a location of a reference line when the bendable unit is bent with reference to the reference line in a second direction that crosses the first direction; determining an area of each of two areas of the foldable device facing each other according to the location of the reference line; and selectively driving the camera unit or the speaker unit according to the areas of the two areas.

The control method of the foldable device may further include, after driving the camera unit, displaying an image acquired by the camera unit on at least one of two display areas of the display unit, divided by the reference line.

The display unit may include: a display panel that includes two flat areas corresponding to the two flat units, and a bendable area corresponding to the bendable unit, and displays an image; and a panel support unit that includes a first support plate and a second support plate that respectively support the flat areas, and a multi-joint member, wherein the multi-joint member includes a plurality of joint units, each including a fixed end that supports the display panel and a free end that extends from the fixed end and rotates about a hinge shaft, and distances between the free ends of at least two adjacent first joint units among the plurality of joint units are regular between a folded state and an opened state of the display unit.

The camera unit may be exposed to an outside when the area of a first area among the two areas is greater than the area of a second area among the two areas, and the speaker unit may be exposed to the outside when the area of the second area is greater than the area of the first area.

According to an aspect of exemplary embodiments, a defect of the foldable device can be prevented or substantially prevented.

According to another aspect of exemplary embodiments, a user can easily use associated functions in the foldable device.

According to another aspect of exemplary embodiments, the user can also be provided with a new user experience.

DETAILED DESCRIPTION

Figure 1A:
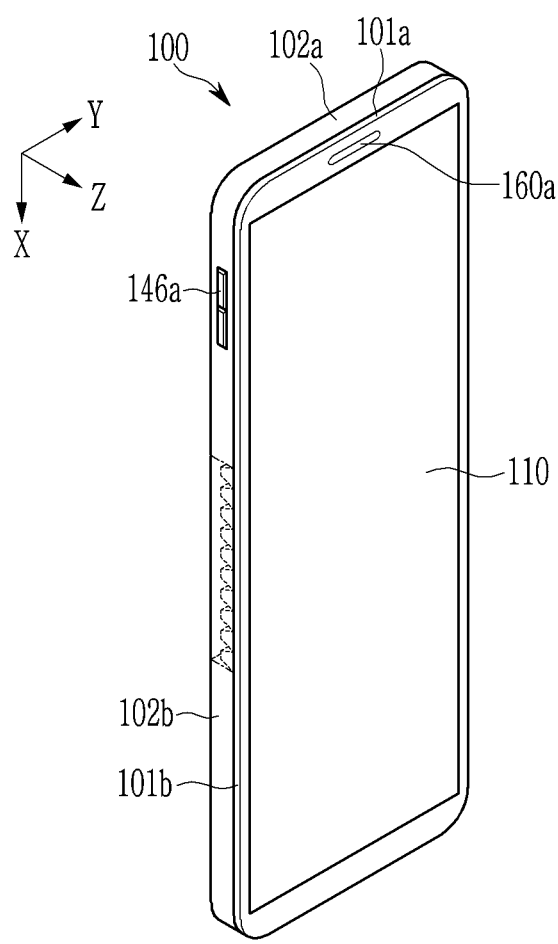
FIG. 1A is a schematic front perspective view of a foldable device according to an exemplary embodiment, shown in an unfolded state.

Herein, some exemplary embodiments of the present invention will be described in more detail with reference to the accompanying drawings. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements. In addition, the term "unit" used in the specification implies a hardware constituent element such as an FPGA or ASIC, and performs a function. However the term "unit" is not limited to software or hardware. Thus, as an example, the term "unit" includes constituent elements such as software constituent elements, object oriented software constituent elements, class constituent elements, and task constituent elements, as well as processes, functions, attributes, procedures, sub-routines, segments of program codes, drivers, firmware, microcodes, circuits, data, databases, data structures, tables, arrays, and variables. Functions provided in the constituent elements and the "units" may be combined to a smaller number of constituent elements and "units" or further divided into additional constituent elements and "units."

In addition, in this specification, the phrase "on a plane" means viewing a target unit from the top, and the phrase "on a cross-section" means viewing a cross-section formed by vertically cutting a target unit from the side.

In the present specification, the term "foldable device" means an electronic device that can be folded.

Figure 1B:
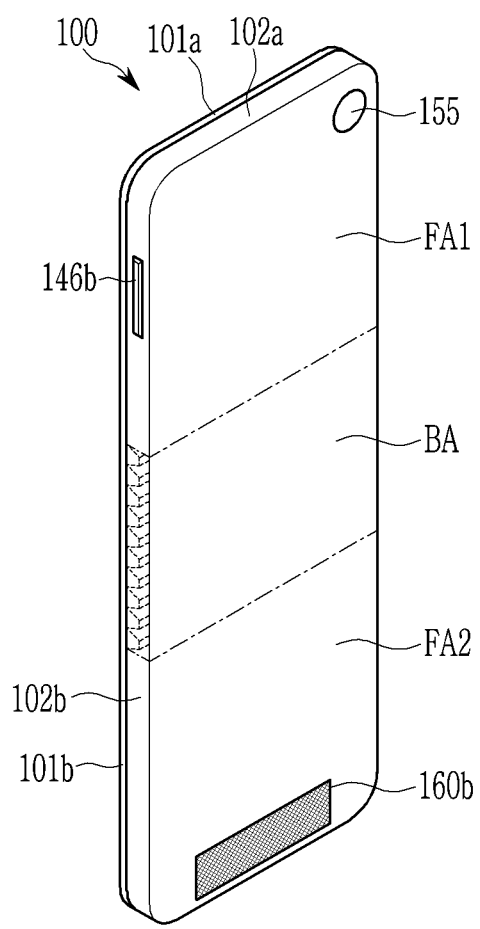
FIG. 1B is a schematic rear perspective view of the foldable device of FIG. 1A, shown in the unfolded state.
Figure 1C:
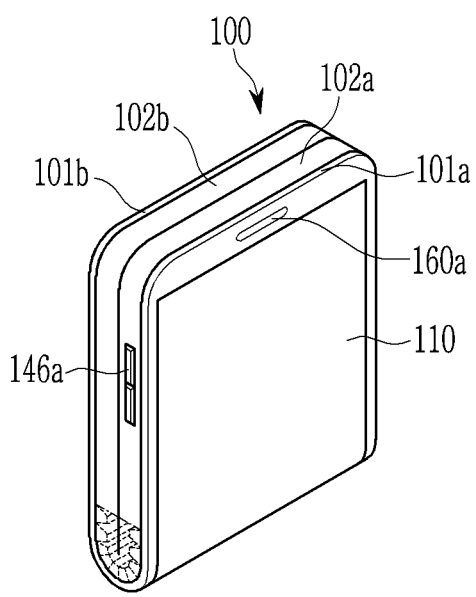
FIG. 1C is a schematic front perspective view of the foldable device of FIG. 1A, shown in a folded state.

In addition, the term "fold/folded/folding" may imply that a flat-shaped electronic device is deformed with reference to an arbitrary line and, thus, opposite sides that face each other become close enough to contact each other (refer to FIG. 1C. In this case, the flat-shaped electronic device may be deformed by being bent or snapped by a hinge.

For example, when a hinge is provided in the foldable device, two sides folded with respect to the hinge may contact each other and thus become parallel or close to a parallel state such that the foldable device can be folded. In addition, when the foldable device is implemented by using a flexible material, two sides that face each other as the foldable device is bent with reference to an arbitrary line are close to each other in an almost parallel state such that the foldable device can be folded.

Herein, some embodiments of the present invention will be described in further detail with reference to the accompanying drawings so that those skilled in the art can easily carry out the present invention. In order to clearly explain the present invention in the drawings, parts not related to the description may be omitted.

Figure 2:
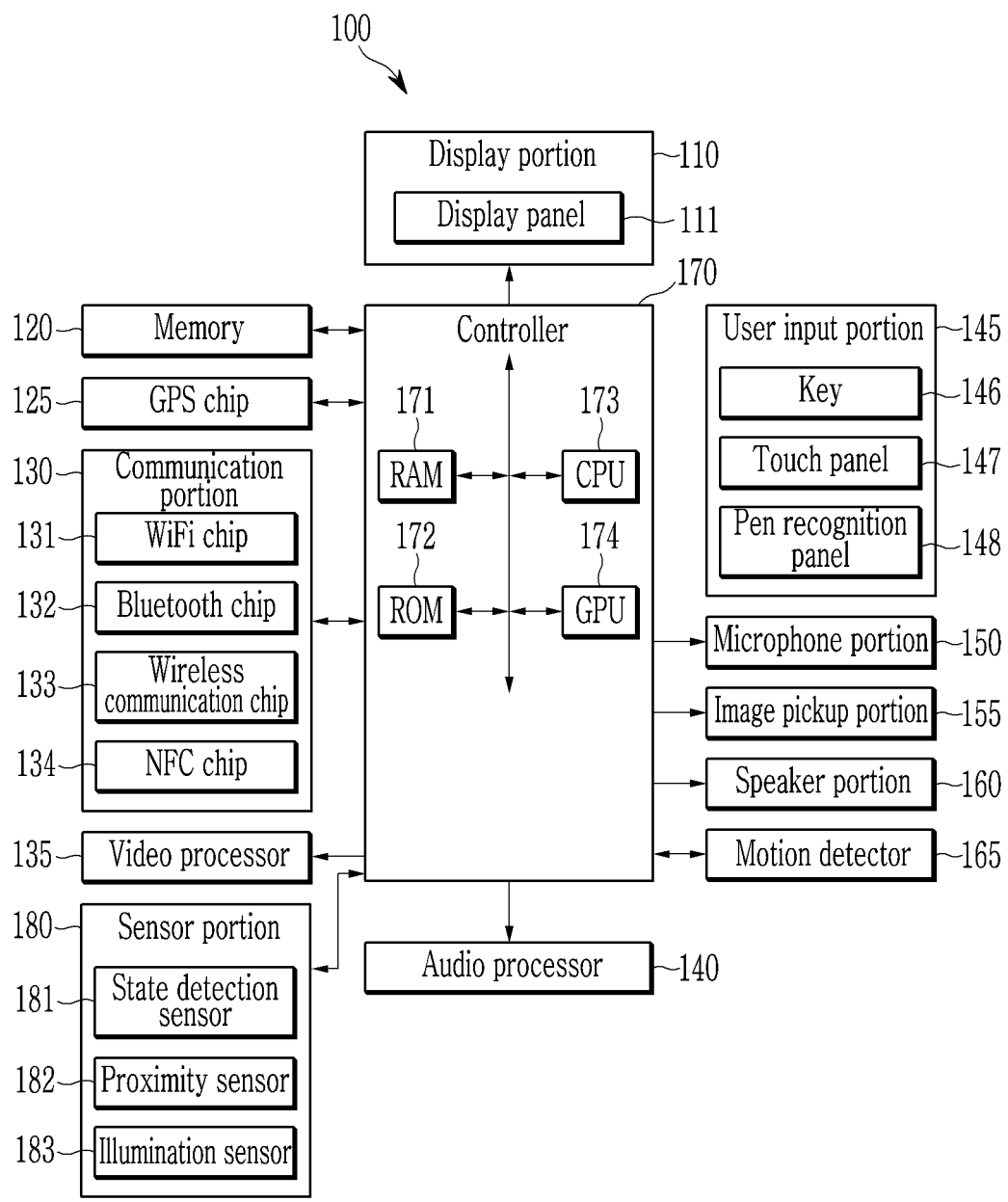
FIG. 2 is a block diagram provided for description of the foldable device according to an exemplary embodiment.

FIG. 1A is a schematic front perspective view of a foldable device according to an exemplary embodiment, shown in an unfolded state; FIG. 1B is a schematic rear perspective view of the foldable device of FIG. 1A, shown in the unfolded state; FIG. 1C is a schematic front perspective view of the foldable device of FIG. 1A, shown in a folded state; and FIG. 2 is a block diagram for description of the foldable device according to an exemplary embodiment.

A foldable device 100 according to an exemplary embodiment may be implemented as a foldable electronic device that can be folded. The foldable device 100 may be used in an unfolded state, as shown in FIGS. 1A and 1B, or may be used in a folded state. as shown in FIG. 1C.

In addition, the foldable device 100 according to an exemplary embodiment can switch a screen depending on an unfolded state or a folded state. In the present specification, a folding shape of the electronic device may be defined into two states, which are a folded state and an open state. A definition of the folded state and the open state will be described later.

Further, in the present specification, a folding motion implies that the foldable device 100 is deformed to the folded state from the open state. An opening motion implies that that foldable device 100 is deformed to the opened state from the folded state.

Depending on exemplary embodiments, the foldable device 100 may be implemented in any of various forms, such as a smartphone, a tablet PC, a notebook, a wearable device, an electronic book, and the like.

The foldable device 100 may be applied to any of various types of devices, such as a mobile phone, a tablet PC, a PDA, an MP3 player, a kiosk, an electron frame, a navigation device, a digital TV, or a wearable device, such as a wristwatch or a head-mounted display.

As shown in FIG. 2, the foldable device 100 may include at least one of a display unit or display portion 110, a controller 170, a memory 120, a GPS chip 125, a communication unit or communication portion 130, a video processor 135, an audio processor 140, a user input unit or user input portion 145, a microphone unit or microphone portion 150, a camera unit or image pickup portion 155, a speaker unit or speaker portion 160, a motion detection unit or motion detector 165, and a sensor unit or sensor portion 180.

The display unit 110 may include a display panel 111 and a controller (not shown) that controls the display panel 111. The display panel 111 may be implemented in any of various forms, such as a liquid crystal display (LCD), an organic light-emitting diode (OLED) display, an active-matrix organic light-emitting diode (AM-OLED), a plasma display panel (PDP), and the like. The display panel 111 may be implemented to be flexible, transparent, or wearable. The display unit 110 may be provided as a touch screen (not shown) by being combined with a touch panel 147 of the user input unit 145. In an embodiment, for example, the touch screen (not shown) may include a module in which the display panel 111 and the touch panel 147 are integrally combined as a stacked structure.

The memory 120 may include at least one of an internal memory (not shown) and an external memory (not shown).

The internal memory may include at least one of a volatile memory (e.g., a dynamic RAM (DRAM), a static RAM (SRAM), a synchronous dynamic RAM (SDRAM), and the like), a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, and the like), a hard disk drive (HDD), and a solid state drive (SSD). According to an exemplary embodiment, the controller 170 may load a command or data received from the non-volatile memory or at least one of other constituent elements to the volatile memory. In addition, the controller 170 may store data received or generated from other constituent elements in the non-volatile memory.

The external memory may include at least one of, for example, a compact flash (CF), a secure digital (SD), a micro secure digital (micro-SD), a mini secure digital (Mini-SD), an extreme digital (xD), and a memory stick.

The memory 120 may store various programs and data used in operation of the foldable device 100. For example, the memory 120 may temporarily or semi-permanently store at least a part of content displayed on a lock screen.

The controller 170 may control the display unit 110 to display the part of the content stored in the memory 120 to be displayed on the display unit 110. That is, the controller 170 may display a part of the content stored in the memory 120 on the display unit 110. Alternatively, when a user gesture is performed in an area of the display unit 110, the controller 170 may perform a control operation corresponding to the user gesture.

The controller 170 may include at least one of a RAM 171, a ROM 172, a CPU 173, a graphics processing unit (GPU) 174, and a bus 175. The RAM 171, the ROM 172, the CPU 173, and the GPU 174 may be connected with each other through the bus 175.

The CPU 173 accesses the memory 120 and performs booting by using an operating system (OS) stored in the memory 120. In addition, the CPU 173 performs various operations by using various programs, contents, and data stored in the memory 120.

Command sets and the like for system booting are stored in the ROM 172. For example, when a turn-on command is input and power is supplied, the CPU 173 copies the OS stored in the memory 120 to the RAM 171 according to a command stored in the ROM 172 and executes the OS to boot the system. When booting is completed, the CPU 173 copies various programs stored in the memory 120 to the RAM 171, and executes the programs copied to the RAM 171 to perform various operations. Once the foldable device 100 is booted, the GPU 174 displays a user interface (UI) screen on an area of the display unit 110. The GPU 174 may generate a screen in which an electronic document includes various objects such as content, an icon, a menu, and the like. The GPU 174 may calculate attribute values, such as a coordinate value on which each object is to be displayed, a shape, a size, a color, and the like, depending on a screen layout. In addition, the GPU 174 may generate a screen of various layouts including objects based on the calculated attribute value. The screen generated by the GPU 174 is supplied to the display unit 110 and thus may be displayed in each area of the display unit 110.

The GPS chip 125 receives a global positioning system (GPS) signal from a GPS satellite and calculates a current location of the foldable device 100. The controller 170 can calculate a user location by using the GPS chip 125 when a navigation program is used or a user's current location is needed.

The communication unit 130 can communicate with various types of external devices depending on various types of communication methods. The communication unit 130 may include at least one of a WiFi chip 131, a Bluetooth chip 132, a wireless communication chip 133, and an NFC chip 134. The controller 170 can communicate with various external devices by using the communication unit 130.

The WiFi chip 131 and the Bluetooth chip 132 may perform communication based on a WiFi method and a Bluetooth method, respectively. In an embodiment, when the WiFi chip 131 or the Bluetooth chip 132 is used, various connection information such as an SSID and a session key is transmitted and received first for establishing a communication connection, and then various information can be transmitted and received through the connection.

The video processor 135 may process contents received through the communication unit 130 or video data included in the contents stored in the memory 120. The video processor 135 may perform various image processing, such as decoding of video data, scaling, noise filtering, frame rate conversion, resolution change, and the like.

The audio processor 140 may process contents received through the communication unit 130 or audio data included in the contents stored in the memory 120. The audio processor 140 may perform various processing, such as decoding of audio data, amplification, noise filtering, and the like.

When a playback program with respect to multimedia contents is executed, the controller 170 drives the video processor 135 and the audio processor 140 to play the corresponding contents. The speaker unit 160 may output audio data generated in the audio processor 140.

The user input unit 145 may receive various commands from a user. The user input unit 145 may include at least one of a key 146, a touch panel 147, and a pen recognition panel 148.

The key 146 may include any of various types of keys, such as a mechanical button, a wheel, and the like, which may be provided in various areas such as a front surface, a side surface, and a rear surface of a main body of the foldable device 100.

The touch panel 147 senses a touch input of a user and outputs a touch event value corresponding to a sensed touch signal. When the touch panel 147 is combined with the display panel 111 and thus a touch screen (not shown) is formed, the touch screen may be implemented as any of various types of touch sensors, such as a static, pressure sensitive, or piezoelectric touch sensor.

The pen recognition panel 148 senses a proximity or touch input of a pen according to operation of a pen (e.g., a stylus pen, a digitizer pen, and the like) for touching of the user, and outputs a sensed pen proximity event or pen touch event. The pen recognition panel 148 may be implemented by using, for example, an EMR method, and touch or proximity input can be sensed depending on change in intensity of an electric field caused by proximity or touch of the pen.

The microphone unit 150 receives a user's voice or other sounds and converts the received sound to audio data. The controller 170 may use the user's voice input through the microphone unit 150 or may convert the input user's voice to audio data and store the audio data in the memory 120.

The camera unit 155 may pick up a static image or a motion picture according to control of the user. The camera unit 155 may be provided in plural, such as at least one of a front facing camera or a rear facing camera.

The motion detector 165 may detect motion of the main body of the foldable device 100. The foldable device 100 may be rotated or tilted in various directions. In this case, the motion detector 165 may detect motion attributes, such as a rotation direction and angle, an inclination, and the like by using at least one of various sensors such as a magnetic sensor, an acceleration sensor, a gyroscope sensor, and the like.

The sensor unit 180 may include at least one of a state detection sensor 181, a proximity sensor 182, an illumination sensor 183, a magnetic sensor, an acceleration sensor, a Hall sensor, a gyroscope sensor, a temperature/humidity sensor, an infrared ray sensor, a location sensor (e.g., a GPS), and a pressure sensor, but is not limited thereto. A function of each sensor can be intuitively deduced from the name by a person skilled in the art, so a detailed description will be omitted.

Although not illustrated in FIG. 1 and FIG. 2, depending on exemplary embodiments, a USB port to which a USB connector can be connected, a headset, a mouse, any of various external input ports for connection with various external terminals such as a LAN, a digital multimedia broadcasting (DMB) chip for receiving and processing a DMB signal, and any of various sensors may further be included in the foldable device 100.

Names of the above-described constituent elements of the foldable device 100 may be changed. In addition, the foldable device 100 according to the present exemplary embodiment may be formed by including at least one of the above-stated constituent elements, and one or more of the constituent elements may be omitted or one or more other constituent elements may be further included.

Referring to FIG. 1A and FIG. 1B, in an embodiment, the foldable device 100 is provided with a bar-shaped device body. The foldable device 100 may be divided into flat areas FA1 and FA2 and a bendable area BA. The bendable area BA is disposed between the flat area FA1 and the flat area FA2. As shown in FIG. 1C, the foldable device 100 may be changed to a folded state as the bendable area BA is bent.

However, the present invention is not limited thereto, and, in an embodiment, the entire area of the foldable device 100 may be a foldable area, and two or more bendable areas, which are divided by the flat areas, may be included. Further, the foldable device 100 may be applied to any of various types of structures, such as a folder type, a flip type, a slide type, a swing type, a swivel type, and the like, of which two or more bodies can be relatively movable. Although it will be related to a specific type of foldable device, a description of the specific type of the foldable device may be generally applied to other types of foldable devices.

Here, the device body can be understood as a concept that refers to the foldable device 100 since the foldable device 100 is regarded as at least one assembly.

The foldable device 100 includes a case (e.g., a frame, a housing, a cover, and the like) that forms an exterior appearance. As shown in the drawings, the foldable device 100 may include front cases 101a and 101b and rear cases 102a and 102b. The front cases 101a and 101b and the rear cases 102a and 102b are combined together such that an internal space is formed, and various electronic parts are disposed in the internal space.

A part of the rear cases 102a and 102b that corresponds to the bendable area BA may have a bendable characteristic. The other part of the rear cases 102a and 102b that corresponds to the flat areas FA1 and FA2 may have a rigid characteristic. In an embodiment, the rigid unit of the rear cases 102a and 102b may at least partially expose the bendable area BA, and an additional cover may be detachably combined to the at least partially exposed unit.

In an embodiment, the cases 101a, 101b, 102a, and 102b may be formed by using a synthetic resin or a metal such as stainless steel (STS), aluminum (Al), titanium (Ti), and the like, or may be formed of a combination thereof.

In another embodiment, unlike the above-stated example in which the plurality of cases of the foldable device 100 forms the internal space that receives the various electronic parts, one case may form the internal space. In an embodiment, a foldable device 100 of a unibody formed by extending a synthetic resin or a metal from a side surface to a rear surface may be implemented.

Herein, as shown in FIG. 1A and FIG. 1B, the foldable device 100 in which the display unit 110 and a first speaker unit 160a are disposed at a front side of the foldable device 100, a first key 146a is disposed at a side surface of the foldable device 100, and a second speaker unit 160b and the camera unit 155 are disposed at a rear side of the foldable device 100 will be exemplarily described.

However, such alignment of the elements is not limited thereto. The elements may be omitted or replaced as desired, or may be disposed at other sides. For example, the first speaker unit 160a may not be provided at the front side of the foldable device 100, and the camera unit 155 may be provided not only at the rear side of the foldable device 100 but also at the front side of the foldable device 100.

The display unit 110 displays (outputs) information processed by the foldable device 100. For example, the display unit 110 may display execution screen information of an application program run in the foldable device 100, or UI or GUI information according to the execution screen information.

The display unit 110 may include the flexible display panel 111. In an embodiment, the display unit 110 may form a touch screen together with the touch sensor, and the touch screen may replace at least some functions of the first key 146a as desired.

In an embodiment, the first speaker unit 160a may be implemented as a receiver that delivers a call sound to the ear of a user, and the second speaker 160b may be implemented as a loudspeaker that outputs any of various alarm sounds or multimedia playback sounds.

The first key 146a and a second key 146b are examples of the user input unit 145 that may be manipulated to receive control commands for operation of the foldable device 100, and may be referred to as a manipulating unit.

In the drawings, the first and second keys 146a and 146b are illustrated as mechanical keys, but the present invention is not limited thereto. For example, the first key 146a may be provided as a touch key, or a combination of a touch key and a mechanical key.

Contents input by the first and second keys 146a and 146b can be variously set. For example, the first key 146a may receive commands such as adjusting of a sound scale output from the first speaker unit 160a or the second speaker unit 160b, conversion into a touch recognition mode of the display unit 110, and the like, and the second key 146b may receive commands such as power on/off, start, termination, scroll, and the like.

In an embodiment, a fingerprint recognition sensor that recognizes a fingerprint of a user may be provided in the foldable device 100, and the controller 170 may use fingerprint information sensed by the fingerprint recognition sensor as an authentication means. In an embodiment, the fingerprint recognition sensor may be embedded in the display unit 110 or the user input unit 145.

In an embodiment, the camera unit 155 may be disposed at the rear side of the foldable device 100. The camera unit 155 may be an array camera including a plurality of lenses that are arranged along at least one line.

The second speaker unit 160b may be disposed at the rear side of the foldable device 100. In an embodiment, the second speaker 160b may be used for implementing a speakerphone mode at the time of a call.

As shown in FIG. 1C, in an embodiment, the foldable device 100 may be symmetrically folded such that two areas that face each other when the foldable device 100 is bent have a same area. In another embodiment, the foldable device 100 may be asymmetrically folded such that two areas that face each other when the foldable device 100 is folded have different areas.

A structure of the display unit 110 for symmetrically or asymmetrically folding the foldable device 100 will be described with reference to FIG. 3 to FIG. 7.

First, the display unit 110 when the foldable device 100 is in an opened state will be described with reference to FIG. 3 and FIG. 4.

Figure 3:
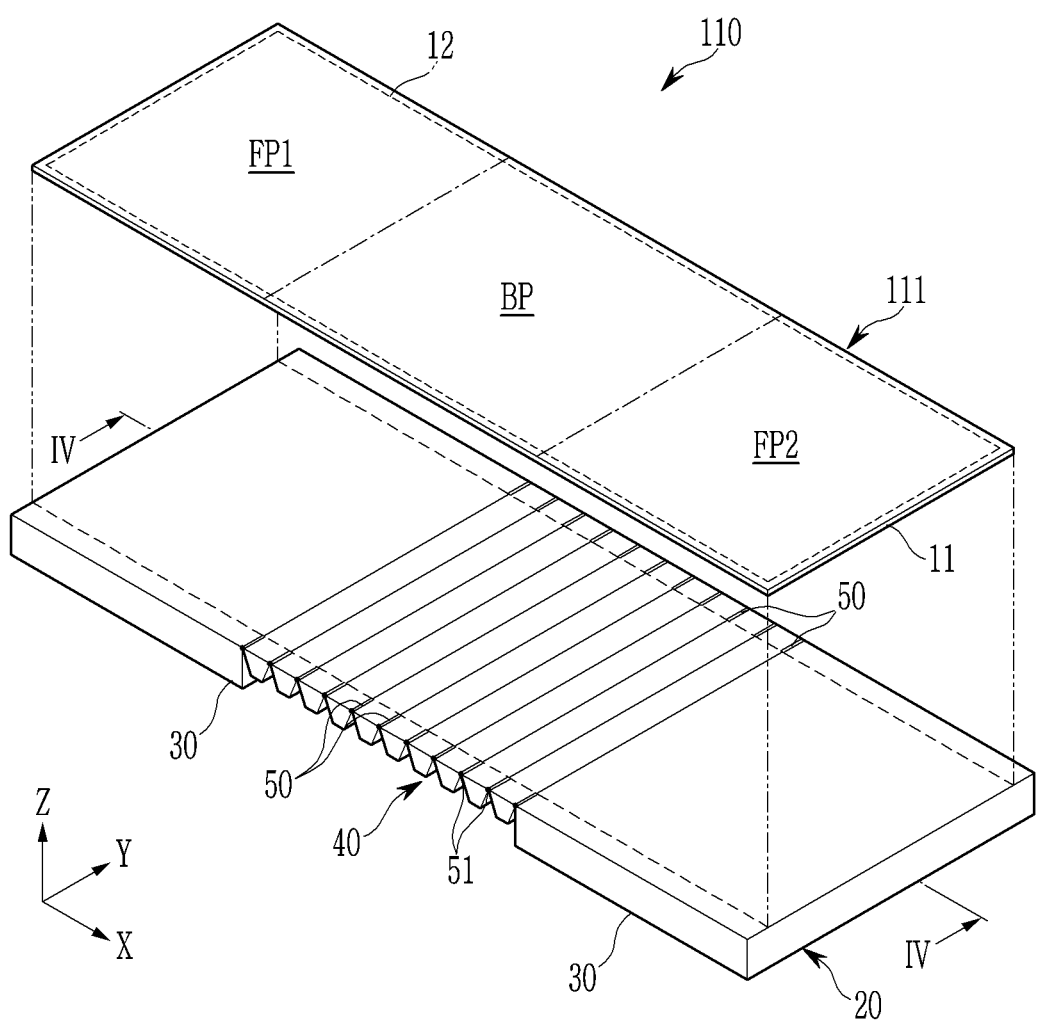
FIG. 3 is an exploded perspective view of a foldable device in an unfolded state according to an exemplary embodiment.
Figure 4:
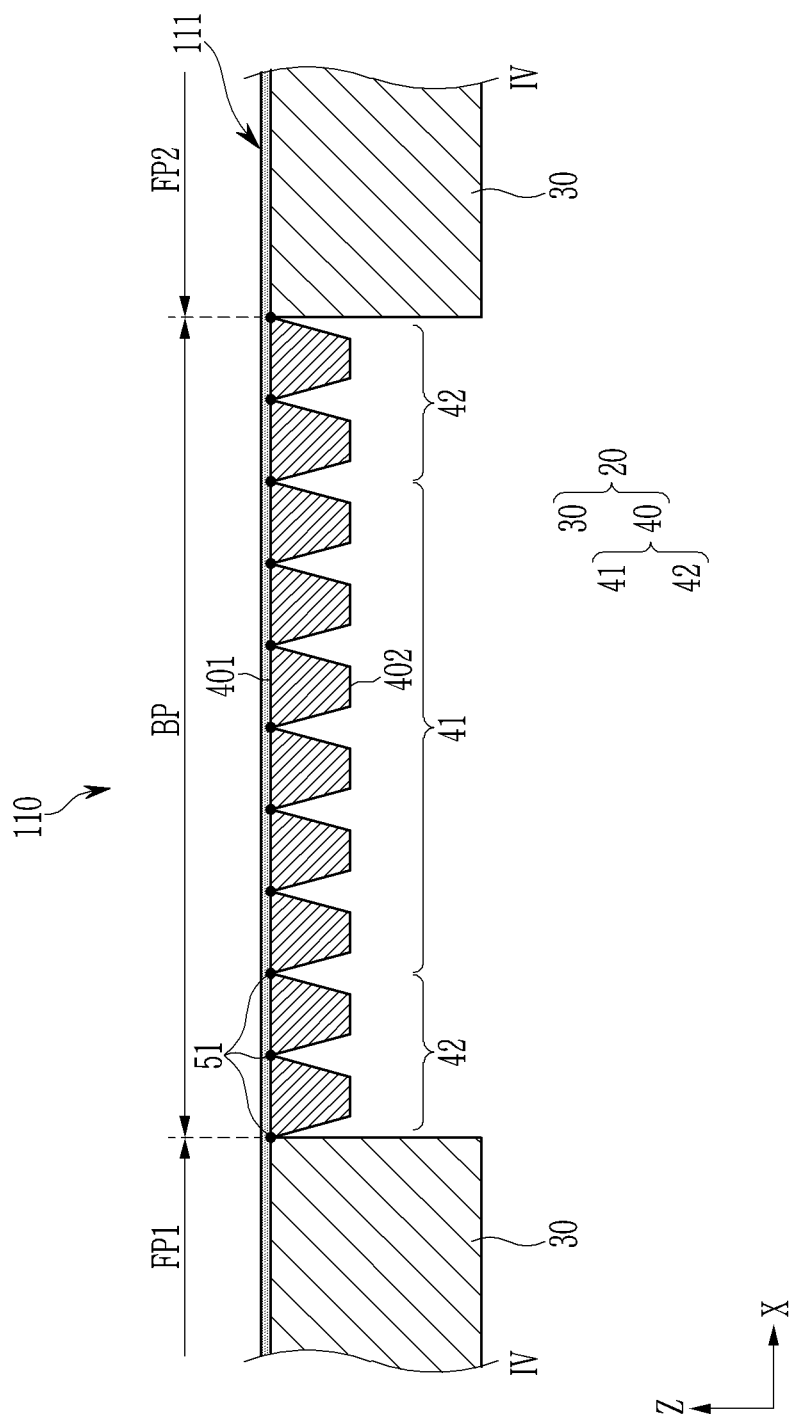
FIG. 4 is a cross-sectional view of a display unit of the foldable device of FIG. 3, taken along the line IV-IV.

FIG. 3 is an exploded perspective view showing the display unit 110 of the foldable device 100 in the opened state according to an exemplary embodiment; and FIG. 4 is a cross-sectional view of the display unit 110 of FIG. 3, taken along the line IV-IV.

The display unit 110 includes the display panel 111 and a panel support unit 20 that is combined with the display panel 111 to support the display panel 111.

The display panel 111 includes a flexible substrate 11 and a display unit 12 that is disposed on the flexible substrate 11. In an embodiment, the flexible substrate 11 may include a plastic film, and the display unit 12 may include a plurality of pixels and a plurality of driving circuits. The display panel 111 may be one of an organic light-emitting display panel, a liquid crystal panel, and an electrophoretic display panel, but is not limited thereto.

The display panel 111 is divided into flat units FP1 and FP2 and a bendable unit BP. For example, the display panel 111 may be divided into the bendable unit BP that is disposed at a center of the display panel 111 and the two flat units FP1 and FP2 that are disposed at opposite sides of the bendable unit BP. The bendable unit BP is disposed corresponding to the bendable area BA of the foldable device 100, and the flat units FP1 and FP2 are disposed corresponding to the flat areas FA1 and FA2. Based on a first direction (e.g., an X-axis direction), the bendable unit BP and the flat units FP1 and FP2 may have a same length or different lengths.

The panel support unit 20 may include two support plates 30 corresponding to the two flat units FP1 and FP2, and a multi-joint member 40 corresponding to the bendable unit BP. The multi-joint member 40 includes second joint units 42 that are adjacent to the two flat units FP1 and FP2 and first joint units 41 disposed between the second joint units 42.

When the foldable device 100 is in the opened state, the first joint units 41 and the second joint units 42 are arranged along the first direction (e.g., the X-axis direction).

The first joint units 41 and the second joint units 42 may be formed in the shape of a bar that extends along a second direction (e.g., a Y-axis direction) that crosses the first direction. In an embodiment, each of the first joint units 41 and the second joint units 42 may have a cross-section that has a shape of a triangle, a polygon, such as a trapezoid, or a partially curved figure, and the shape of the cross-section of each of the first and second joint units 41 and 42 may be different from one another.

A hinge unit 50 may be provided between the support plate 30 and the second joint unit 42, between the second joint units 42, between the first joint units 41 and the second joint units 42, and between the first joint units 41. The hinge unit 50 has a hinge shaft 51, and the support plate 30, the first joint units 41, and the second joint units 42 may rotate about the hinge shaft 51.

In an embodiment, the first joint unit 41 and the second joint unit 42 may include a fixed end 401 that supports the display panel 111 and a free end 402 that extends from the fixed end 401 and rotates about the hinge shaft 51. The free ends 402 of the joint units 40 that are adjacent to each other while being in the opened state may have a regular, or same, distance. For example, free ends 402 of two adjacent first joint units 41 have a regular distance, free ends 402 of two adjacent second joint units 42 have a regular distance, and free ends 402 of a first joint unit 41 and a second joint unit 42 that are adjacent to each other have a regular distance.

The foldable device 100 may be folded in either of an out-folding method in which the display panel 111 is disposed outside the panel support unit 20 while the foldable device 100 is in the folded state, and an in-folding method in which the display panel 111 is disposed inside the panel support unit 20 while the foldable device 100 is in the folded state, but, herein, the out-folding method will be described as an example for ease of description.

Figure 5:
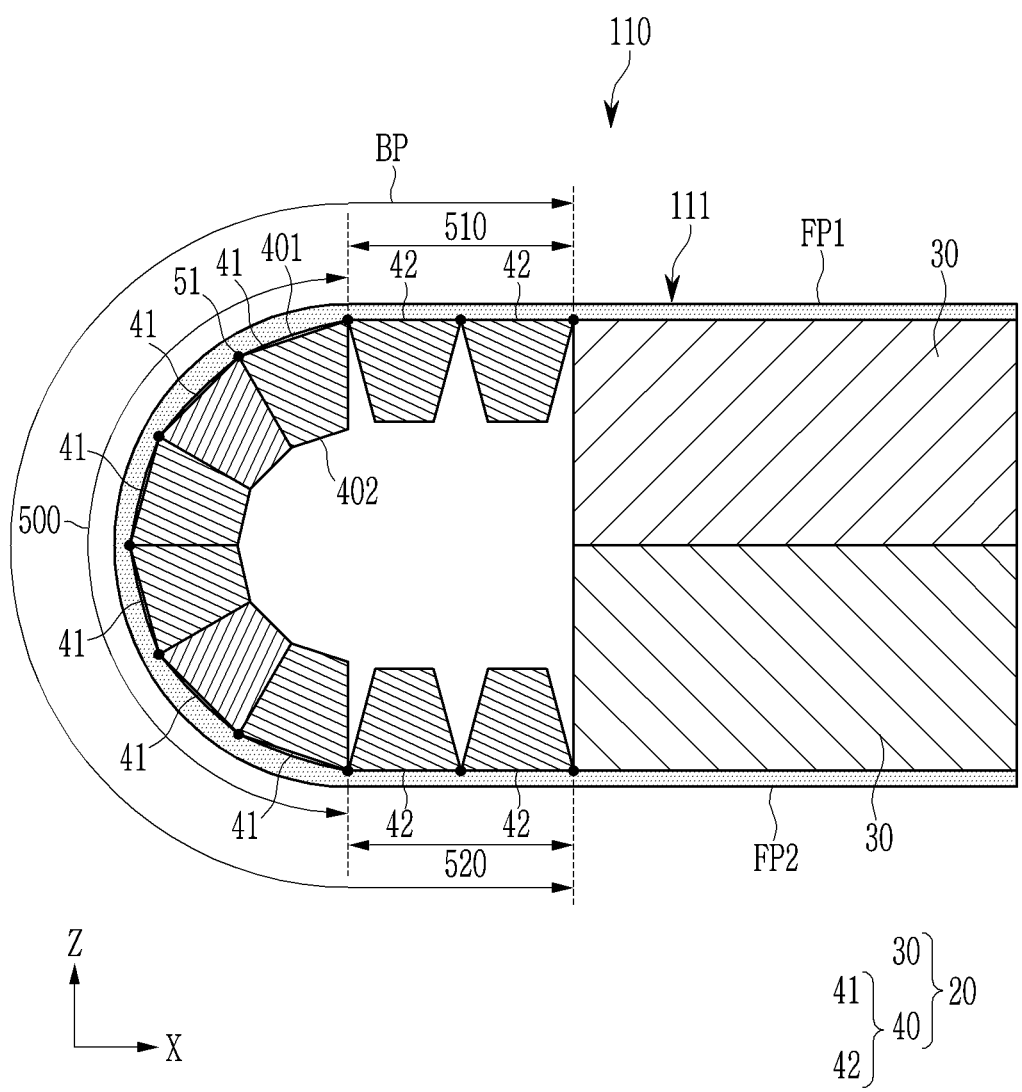
FIG. 5 to FIG. 7 are cross-sectional views of a display unit of a foldable device in a folded state.
Figure 6:
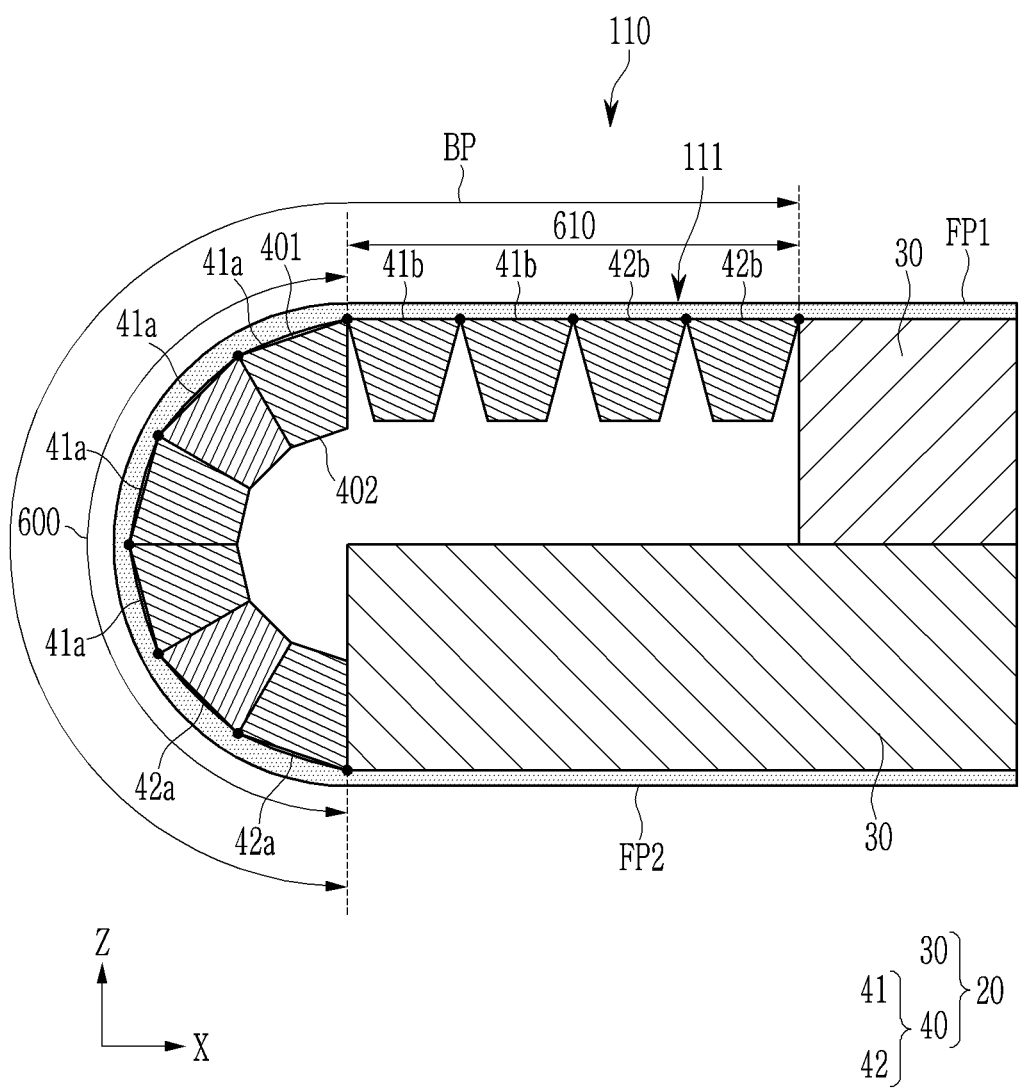
Figure 7:
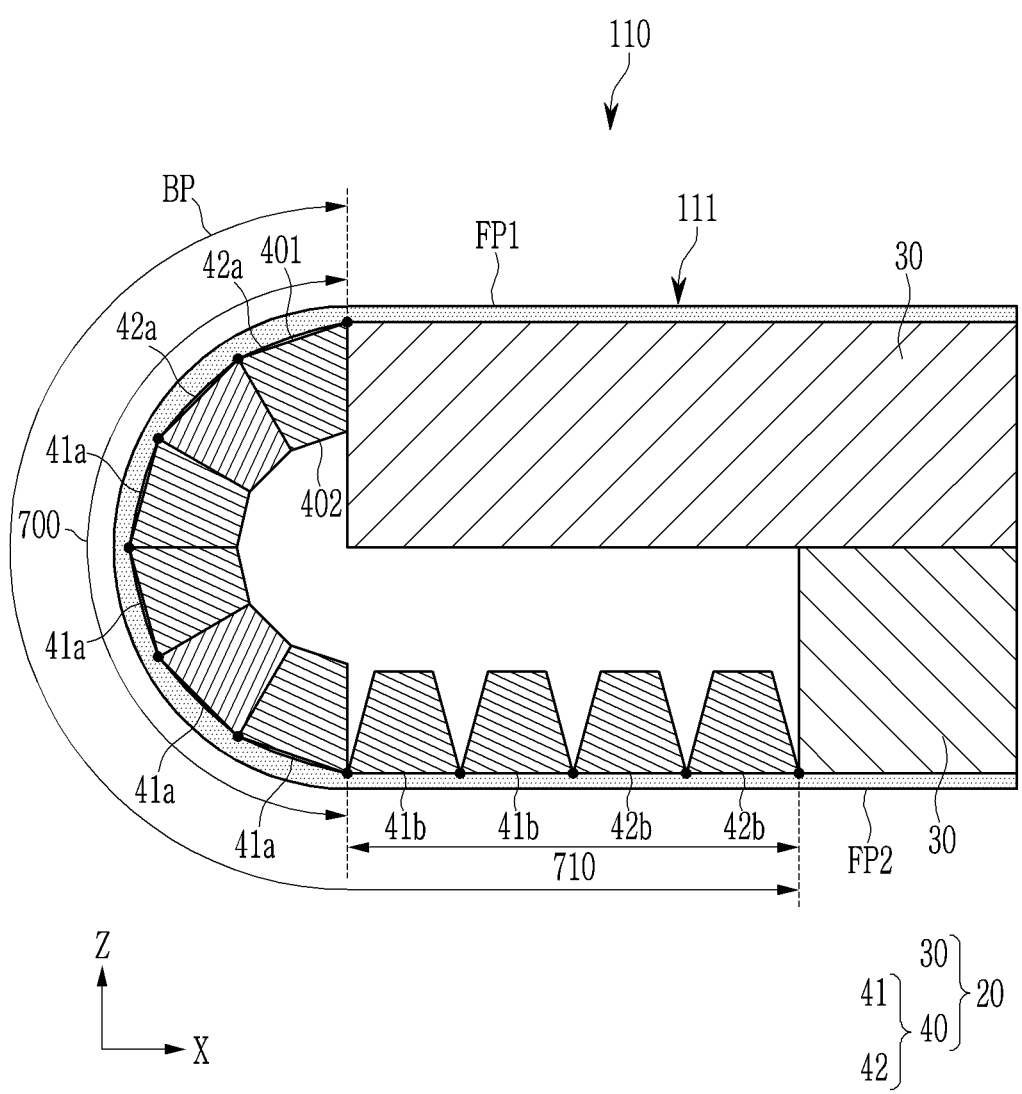

Referring to FIG. 5 to FIG. 7, the folded state of the foldable device 100 will now be described.

FIG. 5 to FIG. 7 show cross-sectional views of the display unit 110 of the foldable device 100 in the folded state. Referring to FIG. 5, the foldable device 100 is bent with the bendable unit BP of the display panel 111 being symmetrical.

When the bending unit BP is symmetrically folded, the first joint units 41 rotate about the hinge shafts 51, respectively, and, thus, a first area 500 of the bendable unit BP is bent while forming a curved surface.

A length of the bendable unit BP on an X-Z plane is longer than that of the curved surface on the X-Z plane. Since the second joint units 42 do not rotate when the bendable unit BP is symmetrically folded, other areas 510 and 520 of the bendable unit BP form a flat plane. The second joint units 41 are disposed in the other areas 510 and 520 of the bendable unit BP.

The distances of the free ends 402 of the adjacent joint units 40 in the folded state become smaller than the distances in the opened state. For example, when the bendable unit BP is symmetrically folded from the opened state, the free ends 402 of two adjacent first joint units 41 become closer to each other such that the distance between the two free ends 402 is reduced.

In addition, distances between free ends 402 of two adjacent second joint units 42 disposed in the other areas 510 and 520 may be constant, or regular, between the folded state and the opened state.

When the bendable unit BP of the display panel 111 is symmetrically folded, the area of each of the opposite sides of the bendable unit BP, facing each other when the foldable device 100 is bent, may be the same.

Referring to FIG. 6 and FIG. 7, the bending unit BP of the display panel 111 may be implemented to be asymmetrically folded.

When the bendable unit BP is asymmetrically folded, some units of first joint units 41a and some units of second joint units 42a rotate about their own hinge shafts 51 such that an area 600 (see FIG. 6) or an area 700 (see FIG. 7) of the bendable area BP is bent while forming a curved surface When the bendable unit BP is asymmetrically folded, other units of first joint units 41b and other units of second joint units 42b do not rotate, and, thus, another area 610 (see FIG. 6) or another area 710 (see FIG. 7) of the bendable unit BP forms a flat surface. The first joint units 41b and the second joint units 42b are disposed in the area 610 (see FIG. 6) or the area 710 (see FIG. 7) of the bendable unit BP.

A distance between free ends 402 of two adjacent second joint units 42b disposed in the area 610 (see FIG. 6) or the area 710 (see FIG. 7), a distance between free ends 402 of a first joint unit 41b and a second joint unit 42b that are adjacent to each other, and a distance between free ends 402 of two adjacent first joint units 41b may be regular between the folded state and the opened state.

As the display panel 111 is slid or pulled in the X-axis direction, the display panel 111 may become slidable. Some of the joint units forming a curved surface when the display panel 111 is slid or pulled in the X-axis direction may form a flat surface by rotating about the hinge shaft 51, and some of the joint units forming the flat surface may form a curved surface by rotating about their hinge shaft 51.

During sliding, distances between free ends 402 of two adjacent joint units of the multi-joint member 40 may be changed. For example, when the display unit is changed to the folded state of FIG. 6 from the folded state of FIG. 5, free ends 402 of two adjacent first joint units 41 are distanced from each other such that a distance therebetween is increased, and free ends 402 of a first joint unit 41a and a second joint unit 42a that are adjacent to each other become close to each other such that a distance therebetween is reduced.

Accordingly, a unit that is bent while forming a curved surface in the bendable unit BP may be changed. For example, by sliding, the display panel 111 may be switched to a state in which the bendable unit BP is symmetrically bent as shown in FIG. 5, asymmetrically folded as shown in FIG. 6, or asymmetrically folded as shown in FIG. 7.

Next, some methods for controlling a foldable device where a slidable display panel 111 is supported will be described with reference to FIG. 8 to FIG. 13B.

Referring to FIG. 8 to FIG. 10B, a control method when a foldable device 100 in an opened state is switched to a folded state will be described.

Figure 8:
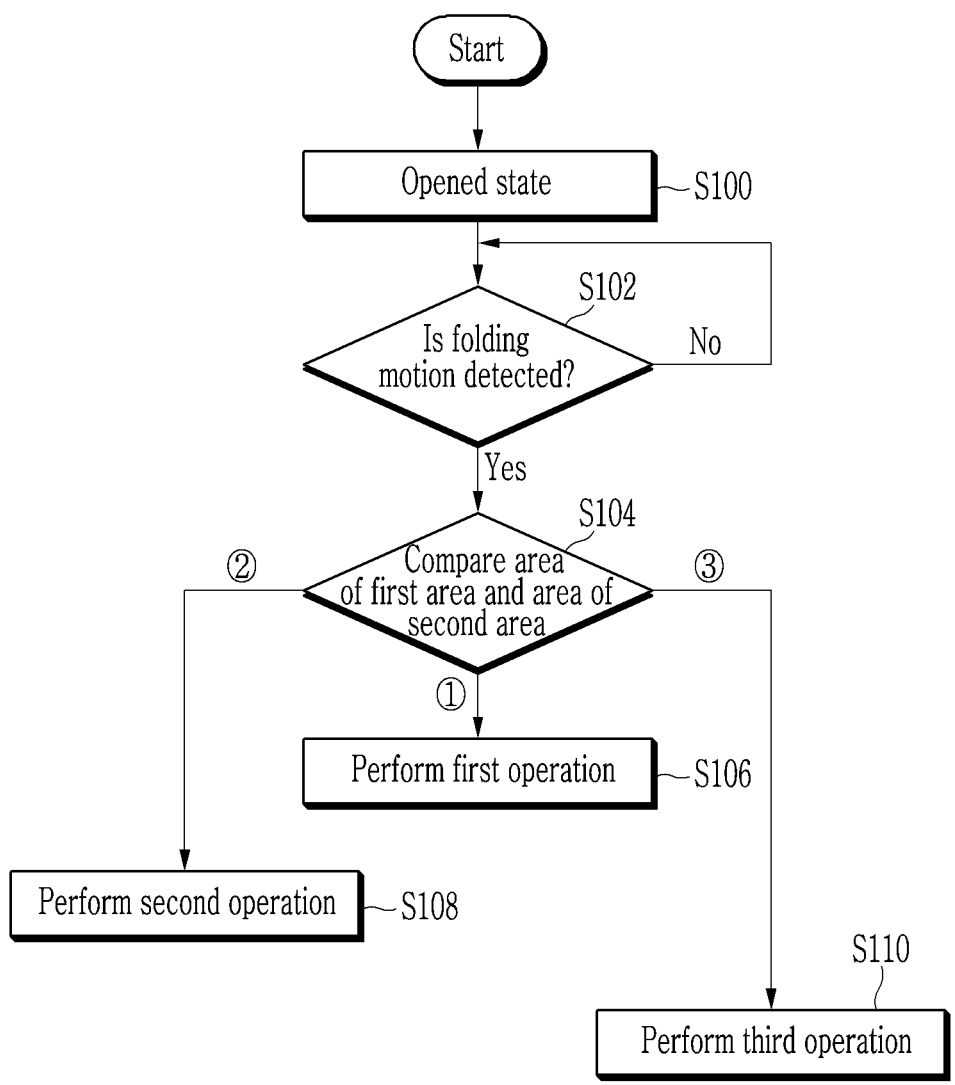
FIG. 8 is a flowchart of a control method of a foldable device, according to an exemplary embodiment.

FIG. 8 is a flowchart of a control method of the foldable device 100, according to an exemplary embodiment; and FIGS. 9A to 9C and FIGS. 10A to 10B respectively show that the foldable device 100 carries out a first operation and a second operation according to the control method of FIG. 8.

Figure 9A:
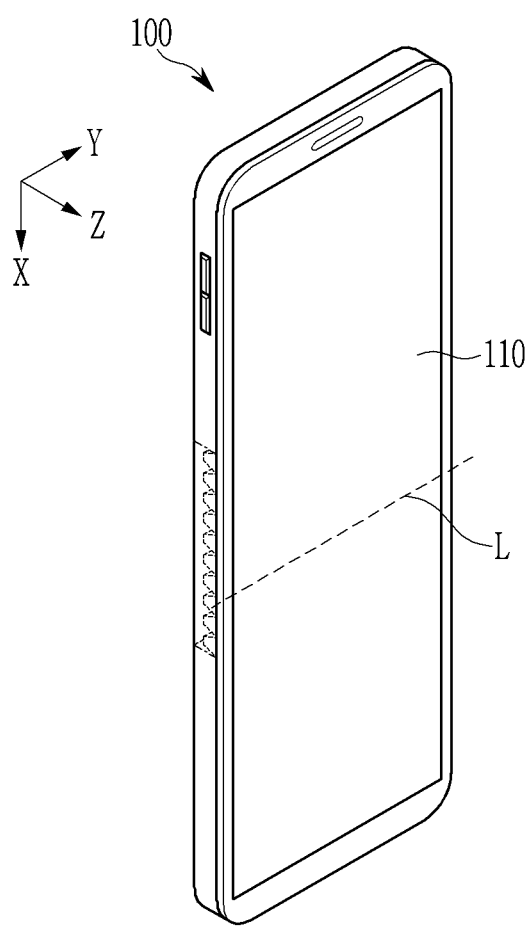
FIGS. 9A to 9C illustrate a first operation of the control method of FIG. 8.
Figure 10A:
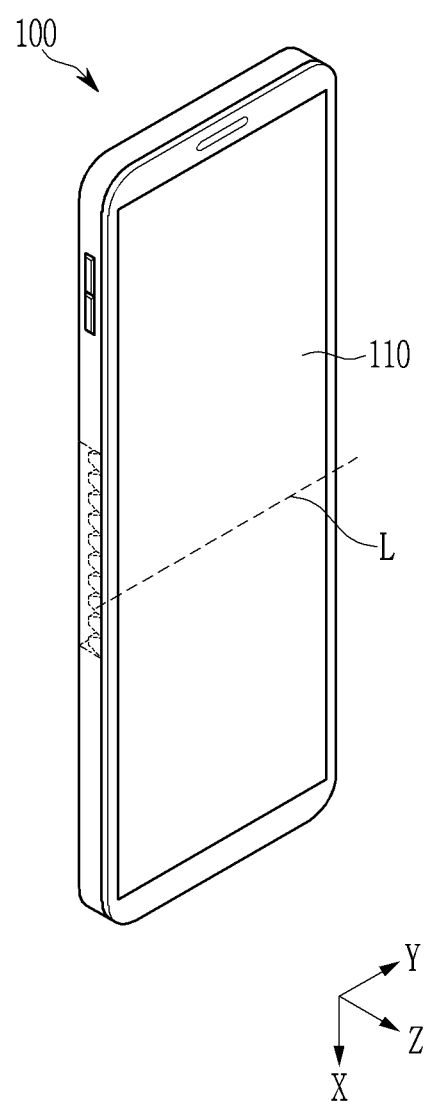
FIGS. 10A and 10B illustrate a second operation of the control method of FIG. 8.

First, the foldable device 100 is in an opened state (S100). As shown in FIG. 9A and FIG. 10A, the foldable device 100 in the opened state can provide a wider display area to a user.

For example, in the opened state, the display unit 110 may display any of a lock screen, an application execution screen of an application executed by the controller 170, a UI screen, and a screen that shows a state of the foldable device 100. The controller 170 executes at least one application, and controls the display unit 110 to display a screen of the at least one application that is being executed on the display unit 110.

When in the opened state, the foldable device 100 may display an application execution screen in the entire display area. Alternatively, the foldable device 100 may divide the display area and display different screens in respective display areas.

Next, the state detection sensor 181 detects a folding motion of the foldable device 100 (S102). The state detection sensor 181 may detect a folding motion and an opening motion of the foldable device 100. Depending on exemplary embodiments, the state detection sensor 181 may detect a motion for changing a state from the folded state to the opened state, or a motion for changing a state from the opened state to the folded state. In an embodiment, for example, the state detection sensor 181 may detect a folding motion or an opening motion by using a Hall sensor or a magnetic sensor provided in the folding area.

The state detection sensor 181 detects whether the foldable device 100 is currently folded or opened, and when the current state is changed, the state detection sensor 181 may detect the folding motion or the opening motion.

According to another exemplary embodiment, the state detection sensor 181 may detect a folded state by disposing the state detection sensor at positions that are close to each other due to bending or opening of the device 100. In an embodiment, the state detection sensor 181 may include at least one of a proximity sensor, an illumination sensor, a Hall sensor, a touch sensor, a bending sensor, and an infrared ray sensor, or a combination thereof.

The state detection sensor 181 may measure a bending or folding angle of the foldable device 100. The state detection sensor 181 may detect a location of an area that is bent while forming a curved surface in the bendable unit BP. That is, the state detection sensor 181 may sense a folded location in the bendable unit BP.

The state detection sensor 181 determines whether the foldable device 100 is in the folded state or in the opened state, and provides a determination result to the controller 170. In an embodiment, the controller 170 determines the state of the foldable device 100 according to the output of the state detection sensor 181 without separately determining whether the foldable device 100 is in the folded state or in the opened state.

When the state detection sensor 181 provides information on a bent or folded angle and sensing information to the controller 170, the controller 170 determines whether the foldable device 100 is in the folded state or in the opened state.

In an embodiment, when the state detection sensor 181 provides information on a location (a bent location) of an area that is bent while forming a curved surface in the bendable unit BP to the controller 170, the controller 170 determines two areas that face each other as the foldable device 100 is bent and sizes of the two areas.

When the folding motion of the foldable device 100 is detected, the controller 170 compares the sizes of the two areas that face each other as the foldable device 100 is bent (S104).

As shown in FIG. 1C, in an embodiment, the two areas facing each other as the foldable device 100 is bent may have the same size. In another embodiment, as shown in FIG. 9B and FIG. 10B, two areas facing each other as the foldable device 100 is bent may be different from each other in size.

As shown in FIG. 9A, the foldable device 100 may be divided into an upper area and a lower area by a reference line L, and the upper area of the foldable device 100 is larger than the lower area. When the foldable device 100 is folded with reference to the reference line L, as shown in FIG. 9B, the upper area of the foldable device 100 may be folded to be larger than the lower area.

Figure 9B:
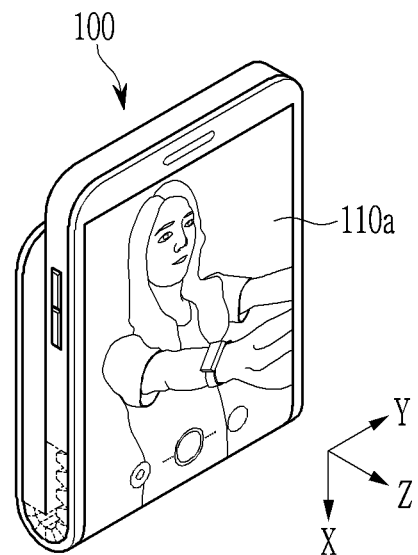
Figure 10B:
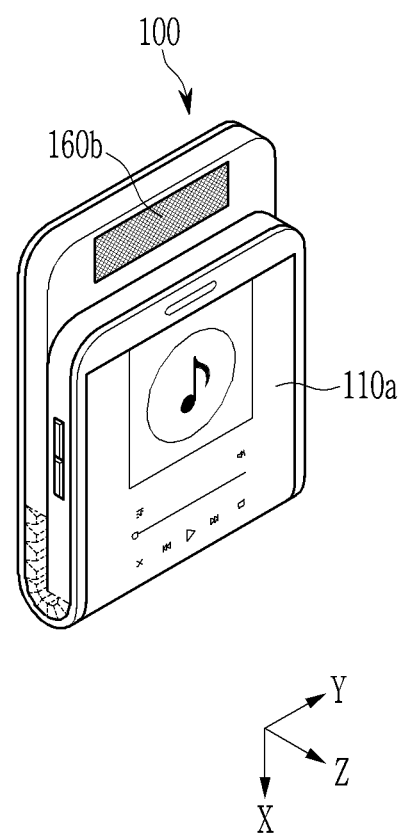

As shown in FIG. 9B, the controller 170 performs a first operation when the upper area of the foldable device 100 is larger than the lower area (①) (S106).

As shown in FIG. 10A, the foldable device 100 may be divided into an upper area and a lower area by a reference line L, and the lower area of the foldable device 100 is larger than the upper area. As shown in FIG. 10B, when the foldable device 100 is folded with reference to the reference line L, the lower area of the foldable device 100 may be bent to be larger than the upper area.

When the lower area of the foldable device 100 is bent to be larger than the upper area (②) as shown in FIG. 10B, the controller 170 performs a second operation (S108).

In another embodiment, as shown in FIG. 1C, when two areas (i.e. the upper area and the lower area) of the foldable device 100 have the same size (③), the controller 170 performs a third operation (S110).

The first operation, the second operation, and the third operation may be determined (e.g., predetermined) by a user, or may be individually set according to each application.

Figure 9C:
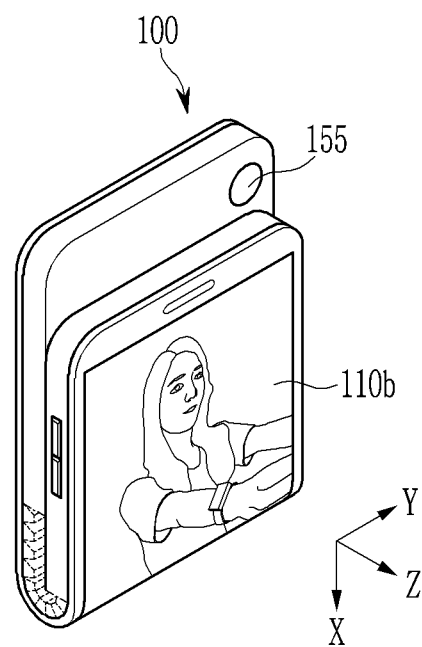

In an embodiment, for example, when the upper area of the foldable device 100 is larger than the lower area and thus the camera unit 155 is exposed to the outside, as shown in FIG. 9C, the controller 170 drives the camera unit 155 as the first operation. The controller 170 may control an image acquired by driving the camera unit 155 to be displayed on at least one of a first display area 110a and a second display area 110b of the display unit 110. In an embodiment, a UI screen may be further displayed on the at least one of the first display area 110a and the second display area 110b for storing and editing the acquired image.

As another example, when the lower area of the foldable device 100 is larger than the upper area and thus the speaker unit 160b is exposed to the outside, as shown in FIG. 10B, the controller 170 may drive the speaker unit 160b as the second operation and output a sound. When the foldable device 100 is changed to the folded state during a call and thus the speaker unit 160b is exposed to the outside, the controller 170 may activate a speaker phone mode to output a call voice through the speaker unit 160b. Alternatively, when the foldable device 100 in a locked state is changed to the folded state and thus the speaker unit 160b is exposed to the outside, the controller 170 may execute a multimedia playback application.

As another example, when the two facing areas of the foldable device 100 have the same size, the controller 170 may activate the locked state as the third operation. Alternatively, when the foldable device 100 is symmetrically folded, the controller 170 may maintain the locked state.

As another example, when the foldable device 100 is changed to the folded state from the opened state, the controller 170 may display different screens on two areas of the display panel 100 that are divided while being in the folded state. For example, an execution screen of a first application may be displayed on one area and a UI screen may be displayed on the other area.

In addition, the first operation, the second operation, and the third operation may include an operation for termination of a currently executed application, a wake-up operation of the foldable device 100, an operation for displaying a progress bar, an operation for execution of an application that is currently being executed, and an operation for maintaining a locked state, but embodiments are not limited thereto.

Next, referring to FIG. 11 to FIG. 13B, a control method when the foldable device 100 in the folded state is slid will be described.

Figure 11:
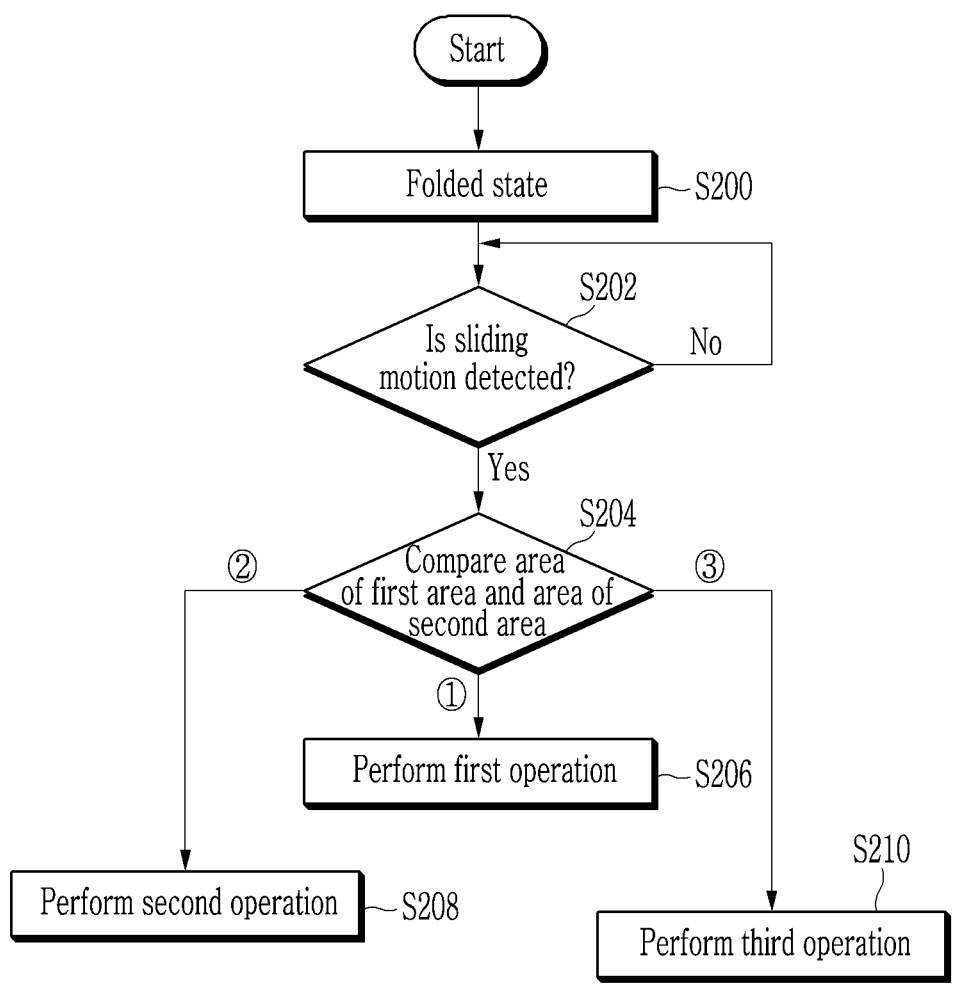
FIG. 11 is a flowchart of a control method of a foldable device according to another exemplary embodiment.

FIG. 11 is a flowchart of a control method of the foldable device 100 according to another exemplary embodiment; and FIGS. 12A to 12B and FIGS. 13A to 13B respectively illustrate a first operation and a second operation according to the control method of FIG. 11.

Figure 12A:
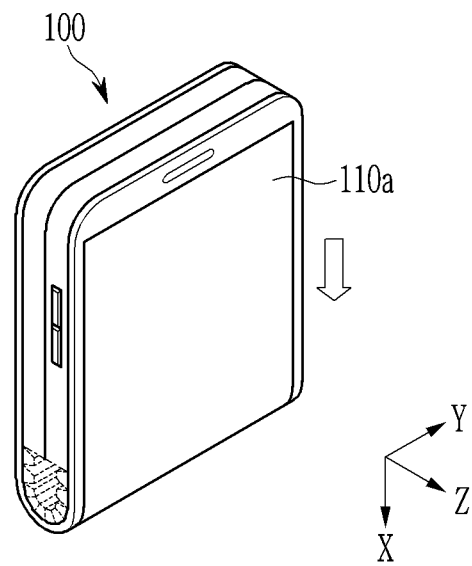
FIGS. 12A and 12B illustrate a first operation of the control method of FIG. 11.
Figure 13A:
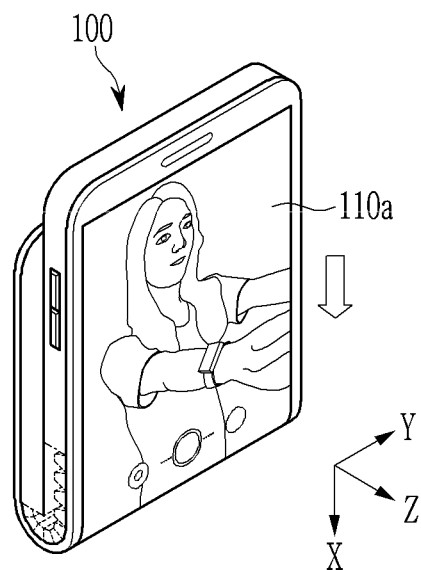
FIGS. 13A and 13B illustrate a second operation of the control method of FIG. 11.

First, the foldable device 100 is in the folded state (S200). As shown in FIG. 12A, the foldable device 100 is in a folded state in which two facing areas have the same size, or as shown in FIG. 13A, the foldable device 100 is in a folded state in which two facing areas have different sizes. The foldable device 100 in the folded state has excellent portability, and it is convenient for a user to grip the foldable device 100.

The state detection sensor 181 detects a sliding motion of the foldable device 100 (S202), and when the sliding motion is detected, the controller 170 compares the area of the upper area and the area of the lower area, which have been changed due to the sliding motion (S204).

As shown in FIG. 12A, when the foldable device 100 that is in the folded state and thus two facing areas have the same size is slid upward along the X-axis direction, the state detection sensor 181 detects the sliding motion of the foldable device 100.

Figure 12B:
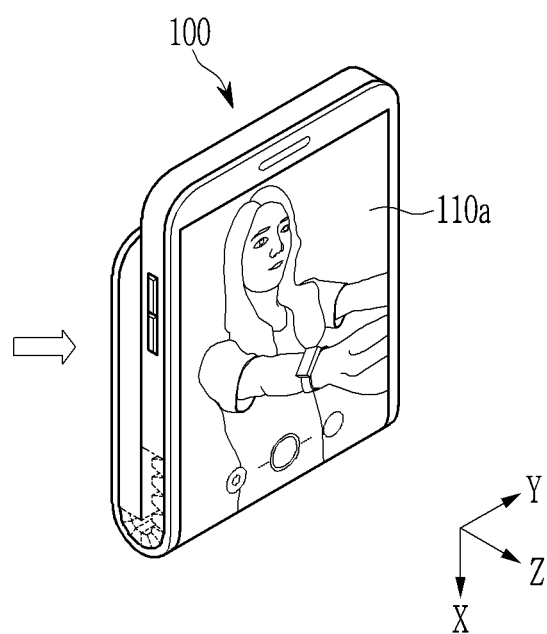

As shown in FIG. 12B, the controller 170 compares the area of the upper area and the area of the lower area of the foldable device 100 after detection of the sliding motion, and performs a first operation when the area of the upper area is larger than the area of the lower area ((①)) (S206).

As shown in FIG. 13A, when the foldable device 100 that is in the folded state and thus two facing areas have the same size is slid downward along the X-axis direction, the state detection sensor 181 detects the sliding motion of the foldable device 100.

Figure 13B:
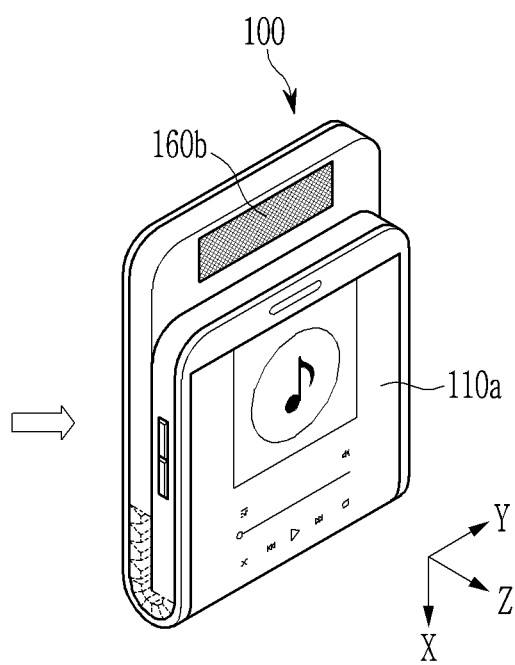

As shown in FIG. 13B, the controller 170 compares the area of the upper area and the area of the lower area of the foldable device 100 after detection of the sliding motion, and performs a second operation when the area of the upper area is smaller than the area of the lower area ((②)) (S208).

Although it is not illustrated, the controller 170 compares the area of the upper area and the area of the lower area of the foldable device 100 after detection of the sliding motion, and performs a third operation when the area of the upper area and the area of the lower area are the same ((③)) (S210).

The first operation, the second operation, and the third operation may be the same as those described above with reference to FIG. 8 to FIG. 10B, and therefore no further description will be provided.

The foldable device 100 and the control method according to exemplary embodiments may provide a new user experience to a user.

According to the foldable device 100 and the control method, a specific unit of the bending unit BP of the display panel 111, corresponding to the bendable area BA of the foldable device 100 can be prevented or substantially prevented from being iteratively bent. Then, various defects, such as detachment, peeling, and cracking, in the bendable unit BP of the display panel 111 can be prevented or substantially prevented from occurring.

While the present invention has been described in connection with what are presently considered to be some practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A foldable device comprising:
a panel support unit comprising a first support plate, a second support plate, and a multi-joint member connecting between the first support plate and the second support plate; and
a display panel on the first support plate, the second support plate, and the multi-joint member,
wherein the multi-joint member comprises a plurality of joint units, each comprising a fixed end supporting the display panel and a free end extending from the fixed end and rotatable about a hinge shaft, and
wherein the display panel is foldable between an opened state and a folded state, and distances between the free ends of at least two adjacent first joint units among the plurality of joint units are constant between the folded state and the opened state.

2. The foldable device of claim 1, wherein when the display panel is slid along a first direction while being in the folded state, the distances between the free ends of the at least two adjacent first joint units among the plurality of joint units are reduced.

3. The foldable device of claim 2, wherein when the display device is slid along a second direction that is opposite to the first direction while being in the folded state, distances between the free ends of at least two adjacent second joint units among the plurality of joint units are increased, and
the at least two first joint units are adjacent to the first support plate and the at least two second joint units are adjacent to the second support plate.

4. The foldable device of claim 3, further comprising:
a state detection sensor configured to detect the opened state and the folded state and to detect a bent location in the folded state; and
a controller configured to compare an area of a first area and an area of a second area of the foldable device divided while being in the bent state by using the folded location, and to perform operations corresponding to comparison results.

5. The foldable device of claim 4, further comprising:
a case, the display panel being at a front side of the case; and
a camera unit and a speaker unit that are arranged apart from each other along the first direction at a rear side of the case,
wherein, when the area of the first area is larger than the area of the second area, the camera unit is exposed to an outside, and when the area of the second area is larger than the area of the first area, the speaker unit is exposed to the outside.

6. The foldable device of claim 5, wherein when the area of the first area is larger than the area of the second area, the controller drives the camera unit.

7. The foldable device of claim 5, wherein when the area of the second area is larger than the area of the first area, the controller drives the speaker unit.

8. The foldable device of claim 4, wherein when the area of the second area and the area of the first area are the same, the controller activates a lock state.

9. The foldable device of claim 4, wherein the state detection sensor is further configured to detect whether the display panel is in the opened state or the folded state, and
when the display panel is changed to the folded state from the opened state, the controller compares the area of the first area and the area of the second area in the folded state by using the bent location, and performs operations corresponding to comparison results.

10. The foldable device of claim 9, wherein, when the display panel is changed to the folded state from the opened state and the area of the first area and the area of the second area are the same, the controller displays execution screens of applications that are different from each other in the two areas of the display panel that are divided in the folded state.

11. A foldable device comprising:
a display unit including two flat units and a bendable unit between the two flat units;
a case, the display unit being at a front side of the case;
a camera unit and a speaker unit that are arranged apart from each other along a first direction at a rear side of the case;
a state detection sensor configured to detect a folded state and an opened state of the display unit, and, when the bendable unit is bent with reference to a reference line in a second direction that crosses the first direction in the opened state, to detect a location of the reference line; and
a controller configured to selectively drive the camera unit or the speaker unit according to the location of the reference line.

12. The foldable device of claim 11, wherein the display unit comprises:
a display panel comprising two flat areas corresponding to the two flat units and a bendable area corresponding to the bendable unit, and configured to display an image; and
a panel support unit comprising a first support plate and a second support plate that respectively support the two flat areas, and a multi-joint member.

13. The foldable device of claim 12, wherein the multi-joint member comprises a plurality of joint units, each comprising a fixed end that supports the display panel and a free end that extends from the fixed end and rotates about a hinge shaft, and
distances between the free ends of at least two adjacent first joint units among the plurality of joint units are constant between the folded state and the opened state of the display unit.

14. The foldable device of claim 13, wherein when the display unit slides along the first direction in the folded state, the distances between the free ends of the at least two adjacent first joint units among the plurality of joint units are reduced.

15. The foldable device of claim 14, wherein when the display unit slides along a third direction that is opposite to the first direction in the folded state, distances between the free ends of at least two adjacent second joint units among the plurality of joint units are increased, and the first joint units are adjacent to the first support plate and the second joint units are adjacent to the second support plate.

16. A control method of a foldable device comprising a case forming an appearance thereof, a display unit arranged at a front side of the case and including two flat units and a bendable unit between the two flat units, and a camera unit and a speaker unit that are arranged apart from each other along a first direction at a rear side of the case, the control method comprising:
detecting a location of a reference line when the bendable unit is bent with reference to the reference line in a second direction that crosses the first direction;
determining an area of each of two areas of the foldable device facing each other according to the location of the reference line; and
selectively driving the camera unit or the speaker unit according to the areas of the two areas.

17. The control method of the foldable device of claim 16, further comprising, after driving the camera unit, displaying an image acquired by the camera unit on at least one of two display areas of the display unit, divided by the reference line.

18. The control method of the foldable device of claim 16, wherein the display unit comprises:
a display panel that includes two flat areas corresponding to the two flat units, and a bendable area corresponding to the bendable unit, and displays an image; and
a panel support unit that includes a first support plate and a second support plate that respectively support the two flat areas, and a multi-joint member,
wherein the multi-joint member comprises a plurality of joint units, each comprising a fixed end that supports the display panel and a free end that extends from the fixed end and rotates about a hinge shaft, and
distances between the free ends of at least two adjacent first joint units among the plurality of joint units are regular between a folded state and an opened state of the display unit.

19. The control method of the foldable device of claim 16, wherein the camera unit is exposed to an outside when the area of a first area among the two areas is greater than the area of a second area among the two areas, and the speaker unit is exposed to the outside when the area of the second area is greater than the area of the first area.

* * * * *